(12) United States Patent
Sargent

(10) Patent No.: US 11,391,344 B1
(45) Date of Patent: Jul. 19, 2022

(54) SWAGELESS CABLE TERMINAL

(71) Applicant: C. Sherman Johnson Company, Inc., East Haddam, CT (US)

(72) Inventor: Carlton W. Sargent, East Haddam, CT (US)

(73) Assignee: C. Sherman Johnson Company, Inc., East Haddam, CT (US)

( * ) Notice: Subject to any disclaimer, the term of this patent is extended or adjusted under 35 U.S.C. 154(b) by 0 days.

(21) Appl. No.: 17/199,935

(22) Filed: Mar. 12, 2021

(51) Int. Cl.
*F16G 11/10* (2006.01)
*D07B 9/00* (2006.01)

(52) U.S. Cl.
CPC .............. *F16G 11/105* (2013.01); *D07B 9/00* (2013.01)

(58) Field of Classification Search
CPC ................................. F16G 11/105; D07B 9/00
See application file for complete search history.

(56) References Cited

U.S. PATENT DOCUMENTS

| | | | | |
|---|---|---|---|---|
| 3,172,180 A | * | 3/1965 | Baricevic | F16G 11/105 403/2 |
| 3,879,147 A | * | 4/1975 | Morell | E04C 5/122 403/369 |
| 3,952,377 A | * | 4/1976 | Morell | E04C 5/122 24/136 R |
| 5,369,849 A | | 12/1994 | De France | |
| 6,381,912 B1 | * | 5/2002 | Sorkin | E04C 5/08 24/459 |
| 6,684,585 B2 | * | 2/2004 | Campbell | E04C 5/08 403/2 |
| 7,043,801 B2 | | 5/2006 | Toimil | |
| 7,726,082 B2 | * | 6/2010 | Hayes | E04C 5/127 52/223.13 |
| 8,065,845 B1 | * | 11/2011 | Sorkin | E04C 5/122 52/223.13 |
| 8,286,309 B2 | | 10/2012 | Landry | |
| 9,062,457 B2 | * | 6/2015 | Gilling | F16B 9/054 |
| 9,181,967 B2 | * | 11/2015 | Lim | F16B 7/025 |
| 9,874,016 B2 | * | 1/2018 | Sorkin | E04C 5/122 |
| 10,240,661 B2 | * | 3/2019 | Manabe | D07B 1/18 |
| 10,436,231 B2 | * | 10/2019 | White | F16G 11/025 |
| 2008/0302035 A1 | * | 12/2008 | Shin | E02D 5/765 52/223.13 |
| 2016/0183991 A1 | * | 6/2016 | Pratt | F16G 11/105 606/74 |

* cited by examiner

*Primary Examiner* — David M Upchurch

(74) *Attorney, Agent, or Firm* — McKormick, Paulding & Huber PLLC

(57) ABSTRACT

A swageless cable terminal for gripping a cable includes an elongated terminal housing with a hollow bore, one portion of which is tapered toward one end of the housing. A set of tapered wedges positioned in the bore of the housing define a central passageway that admits a cable inserted into the housing through the one end. An inserted cable causes the set of wedges to shift in the bore of the housing and expand the passageway within the set of wedges to admit the inserted cable. When an attempt is made to withdraw the inserted cable from the one end of the terminal housing, a compliant pressing ring captured on the inserted cable urges the set of wedges into the tapered portion of the bore in gripping relationship with the cable. The inserted cable can then be secured to another object by means of the housing.

20 Claims, 5 Drawing Sheets

SWAGELESS CABLE TERMINAL

TECHNICAL FIELD

The present invention relates to a swageless cable terminal which grips a cable and provides for securing the cable to a post, hook, turnbuckle, or other object. As indicated, the terminal can be attached to a cable without swaging or other tools for fastening the terminal to the cable in gripping engagement, and without special preparation or modification of the cable to secure the cable to the terminal. The terminal is self-actuating to establish gripping engagement with the cable when tension is applied to the cable in one direction, and is released from the gripping engagement for removal or movement elsewhere along the cable when the cable tension in the one direction is released.

The term "cable" as used in the specification and claims is intended to include multi-strand wire rope and single strand wire. Such cables can be used for a variety of purposes such as barrier or guard railing, canopy support, banner suspension, and numerous other uses where the cable is or can be placed in tension by an external load. The cables can be made from a variety of materials that are suitable for the environment in which the cable is used. For outdoor and marine uses, the cables are typically made from galvanized or stainless steel. The cables can be of various sizes, for example ⅛ inch, 3/16 inch, and ¼ inch. Generally, cables used with swageless terminals are not intended to bear extreme lifting loads.

BACKGROUND

Terminals for cables are necessary appendages for securing the cables to other objects in order to perform some load-carrying function. The terminals generally take several different forms. In one form the cables themselves are partially dismembered in order to lace or clamp the cable strands in a terminal designed to accept and grip the strands. Other terminals have posts or clamping screws around which smaller size cables are wrapped and then clamped. Additionally, some cable terminals are swaged onto the end of a cable by means of swaging tools which grip the cable by means of clamping pressure applied around all or a portion of the cable. Finally there are swageless terminals which grip a cable in a manner similar to a swaged terminal but without the requirement for swaging tools.

Swageless terminals typically have internal gripping components that are self-actuating when the cable is inserted into the terminal in one direction and attempted to be withdrawn in the opposite or restraining direction. By virtue of the operation of gripping elements, the terminals grip and restrain the cable loads in one direction only, and in some cases can be released and removed or reset at another location along the cable by pushing the cable into the terminal in the direction opposite to its restraining direction. In addition to eliminating the requirement for swaging tools, no special preparation of the cable is required with the swageless terminals. Examples of the swageless terminals are found in U.S. Pat. Nos. 3,952,377, 5,369,849, 7,043,801, and 8,286,309.

In swageless terminals the components that grip a cable are typically a set of two or more wedges surrounding the cable with tapered shapes matching a tapered bore within the terminal housing. As the wedges are pressed or drawn into the taper, the wedges close down upon and grip the cable through friction or with the aid of fine serrations on the wedge surfaces in contact with the cable. Once the wedges have a grip on the cable, the more the cable is drawn in the restraining direction, the tighter the grip on the cable. Conversely, if the cable is pushed into the terminal in the direction opposite to the restraining direction, the grip on the cable by the wedges is reduced to the point where the cable is released and will slip past the wedges.

From the description above, it is apparent that for the terminal to grip a cable, some initial engagement of the wedges with the cable is necessary in order for the wedges to be self-actuating and develop a fully secure grip on the cable. For the initial and subsequent engagement, prior art terminals, such as shown in U.S. Pat. No. 8,286,309, have employed a threaded plug that actually presses the wedges into the taper of the terminal bore and forces the wedges into gripping relationship with the cable. With the threaded plug design, the grip between the wedges and cable is established and fixed after the cable is inserted, and will not allow the cable to be released until the threaded plug is unscrewed.

In other swageless terminals, the initial engagement of the wedges and the cable is created by a spring, that presses the wedges into the tapered bore of the terminal, and correspondingly, forces the wedges into engagement with the cable. Such a design is shown in U.S. Pat. No. 7,043,801. The design has the advantage that the wedges have a limited degree of movement against the spring in the tapered bore of the terminal which allows the wedges to spread outwardly and admit a cable between the set of wedges. Springs, however can deteriorate and lose their effectiveness over time, particularly in marine or other harsh environments.

Accordingly, it is an object of the present invention to provide a swageless cable terminal that constitutes an improvement over the prior art, and does not suffer the disadvantages discussed above.

SUMMARY

The present invention relates to a swageless cable terminal for gripping a cable for use in various environments including marine environments where salt air and dampness are challenges to the components. The terminal can be used with cables made from various materials including galvanized and stainless steel and softer metals.

The terminal is comprised of an elongated terminal housing having a hollow bore extending from one end of the housing to the opposite end. One portion of the bore between the ends is tapered toward the one end which places a narrower part of the bore closer to the one end.

A set of tapered wedges fit in the tapered portion of the hollow bore of the terminal housing, and collectively the wedges define a central passageway for admitting a cable inserted into the bore of the housing from the one end. The wedges can then grip and restrain an admitted cable in the passageway when the set of wedges is drawn into the tapered portion of the bore by the cable placed in tension. Therefore, the cable is restrained from withdrawal from the one end of the terminal housing by loads on the cable, and can be anchored or connected to other objects by means of the terminal.

The set of wedges may include two or more wedges distributed circumaxially about the hollow bore of the terminal body. The set of wedges can be retained in an axially aligned and radially expandable relationship by an O-ring wrapped around the wedges in mating circumferential grooves.

A pressing ring is positioned in the hollow bore between the set of tapered wedges and the opposite end of the housing. The ring has an inside diameter selected to have a friction fit on a cable inserted into the terminal housing and through the passageway formed by the set of wedges. The pressing ring when mounted on an inserted cable urges the set of wedges into the tapered bore as the cable is attempted to be withdrawn from the one end of the terminal, or conversely, when the terminal is used to pull and fasten the cable to an anchoring point.

The pressing ring with a friction fit on a cable provides a limited a degree of force against the set of tapered wedges. The force insures that the wedges are pressed into the tapered portion of the bore in the terminal housing and initiate the clamping and gripping force of the wedges against a cable within the passageway. With the initial clamping force causing the wedges to engage the cable, and with the cable in tension, the cable cannot escape the passageway. The tapered wedges are self-actuating to increase the gripping engagement with the cable. The greater the force applied to the cable, the greater the clamping and gripping force caused by the wedges on the cable.

The pressing ring can be made from various materials such as rubber or a urethane. A urethane material has been found to provide a sufficient degree of friction and pressure against the wedges, and is capable of withstanding the abrasive contact with the cable, and harsh marine environments that cause metal springs to deteriorate and weaken.

DESCRIPTION OF THE PREFERRED EMBODIMENTS

Figure 1:
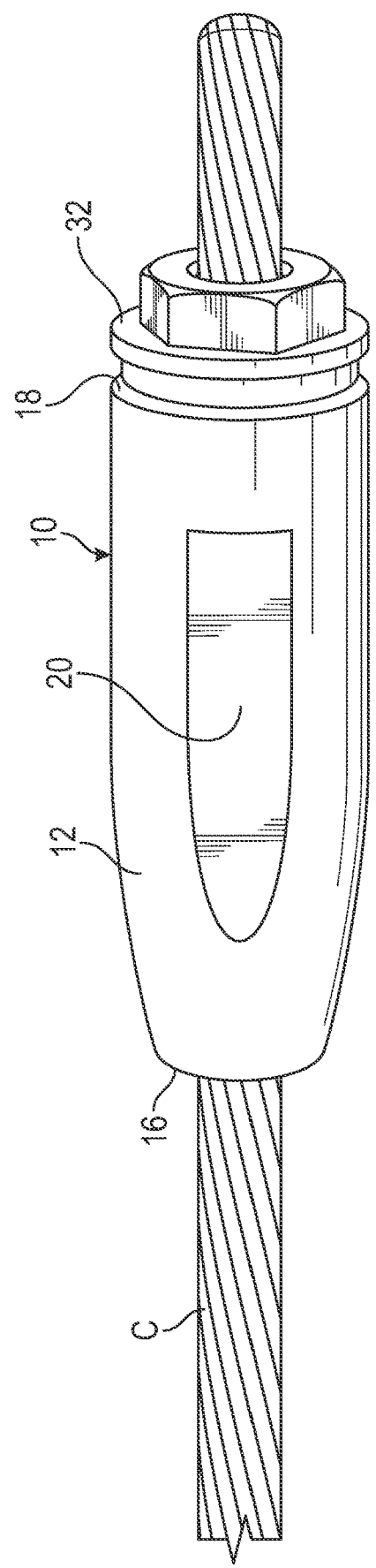
FIG. 1 is a perspective view of a swageless cable terminal of the present invention in assembled form on one end of a cable.
Figure 2:
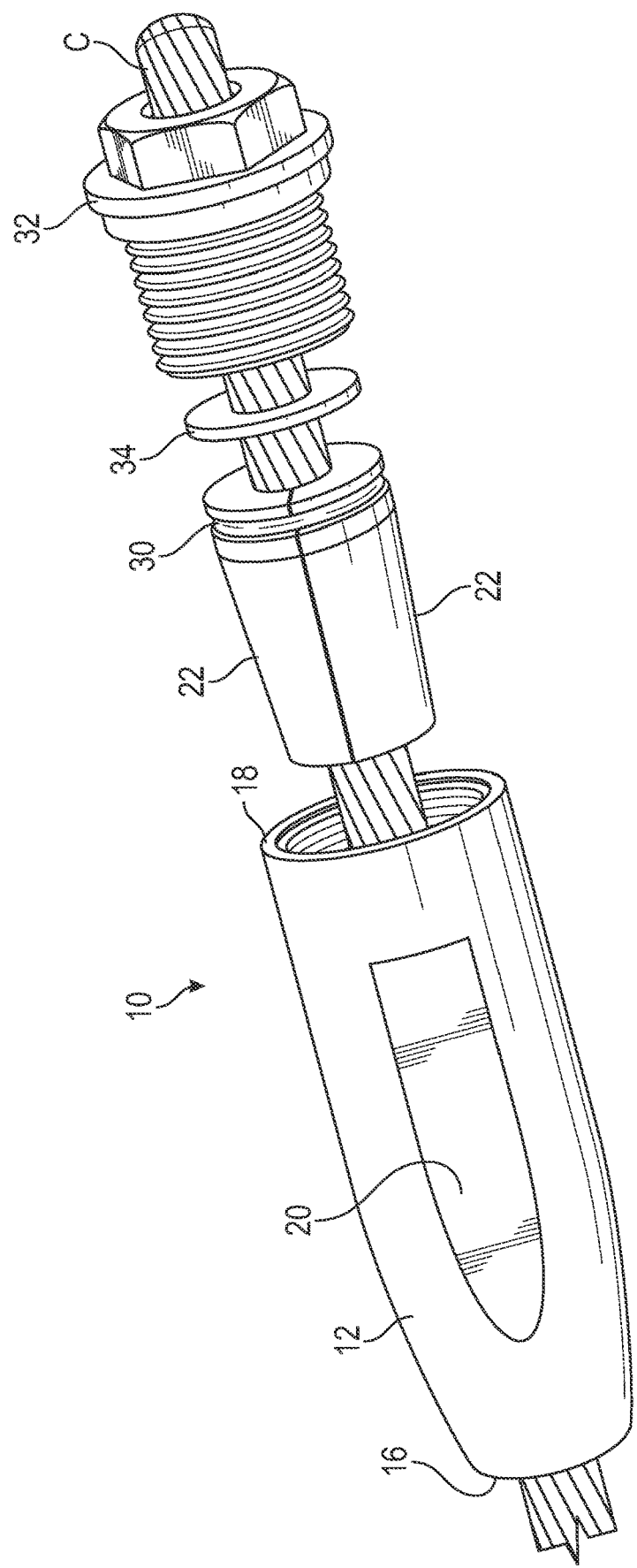
FIG. 2 is an exploded perspective view showing the components of the swageless terminal of FIG. 1 arranged in order along a wire cable.
Figure 3:
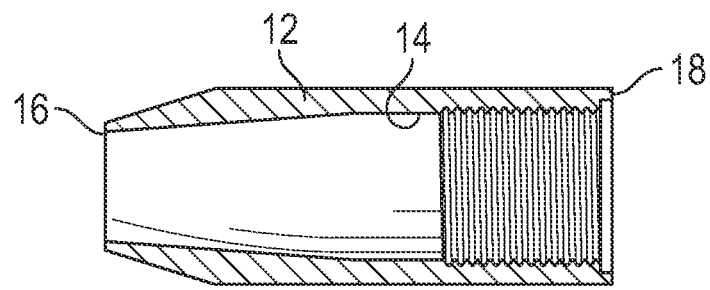
FIG. 3 is a longitudinal cross-sectional view of the terminal housing of the terminal shown in FIG. 1.

FIG. 1 illustrates a preferred embodiment of the swageless cable terminal 10 of the present invention mounted on a cable C. Cable terminals are attached to an end of a cable in order to provide a means for securing the cable to another object, such as a fence post when the cable is serving as safety railing, or many other types of anchoring points. The cable can be of various types composed of single or multiple strands of wire, and the cable can be made of various materials suitable for the environment in which the cable is used. For marine environments, the wire would be made of galvanized or stainless steel.

While cable terminals are frequently secured to cables by a swaging process requiring compression tools, the terminal 10 is secured to a cable without a swaging process and is accordingly referred to as a swageless cable terminal.

As shown in FIGS. 1-4 the terminal 10 has an elongated cylindrical housing 12 with a hollow interior bore 14 extending from one end 16 of the housing to the opposite end 18. The housing has a bullet-shaped outer configuration with the end 16 being smaller than the opposite, larger end 18; however the bullet-shape is not essential and numerous other shapes are possible. A pair of flats 20 (only one visible in the figures) are provided on opposite sides of the outer surface of the housing 12 for gripping cylindrical housing with a wrench. A plurality of flats in a hexagonal configuration could also be provided on the outer surface for the same purpose.

The housing 12 is made of metal, preferably a stainless steel for use with stainless steel cables in harsh environments such as salt air marine environments. However, other metals can also be used to form the housing where protection from a harsh environment is not critical.

As shown in FIGS. 3, 5, 6, and 7, the interior bore 14 of the housing 12 is threaded at the larger end 18 of the housing, and has a tapered portion between the threads and the smaller end 16. The taper extends toward the smaller end so that the narrower part of the bore is closer to the smaller end 16, and the larger part of the bore is closer to the larger end 18. The tapered portion does not extend the full length of the bore 14 between the threads and the smaller end, and as shown occupies a lesser portion of the bore. The angle of the taper can be in the range of five degrees (5°) to 10 degrees (10°).

Figure 4:
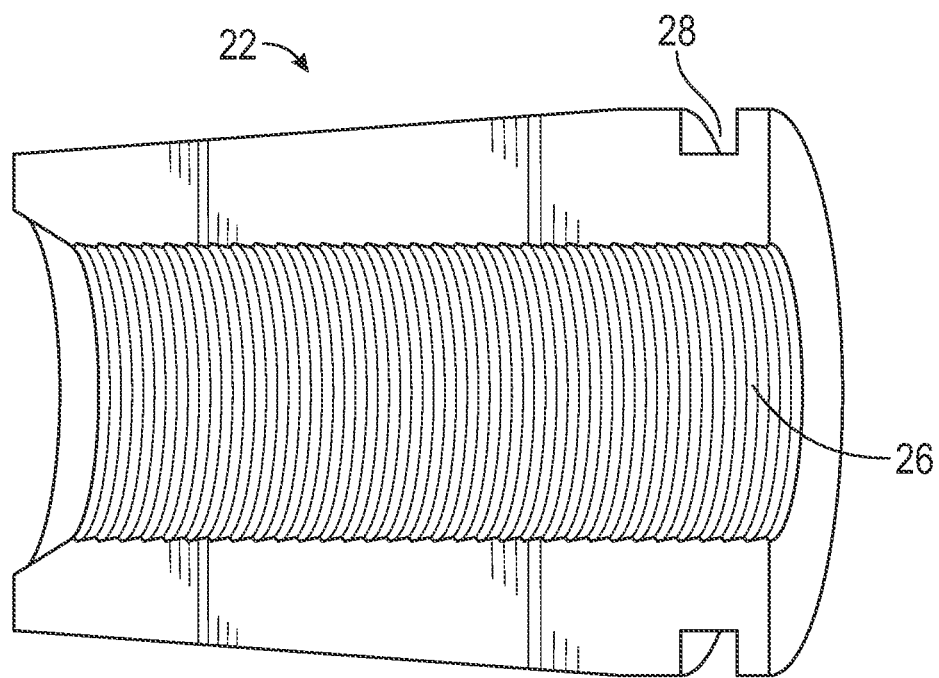
FIG. 4 is a longitudinal view of one of the wedges of the terminal in FIG. 1.

A set of tapered wedges 22 shown in FIGS. 2, 4, and 5-7 with a taper angle matching the tapered portion of the bore 14 is positioned in the bore. The set may include two or more wedges distributed circumaxially about the axis of the housing, and having inner surfaces 24 collectively defining a central passageway through the wedges. In the embodiment shown the set consists of two wedges, one of which is shown in FIG. 4, with each wedge subtending an angle of about 180° around the central passageway. Each wedge has serrations 26 forming gripping teeth on the inner surface 24, and a circumaxial grove 28 in the outer surface near the larger end of the taper. As shown in FIGS. 2 and 5-7 a rubber O-ring 30 is positioned in the circumaxial grove 28 in the outer surfaces of the wedges 22 to draw the wedges together, and also hold the wedges in axially aligned relationship within the bore 14 of the housing 12.

The length of the wedges 22 along the axis of the housing bore 14 is less than the length of the tapered portion of the bore so that the wedges can move together axially within the bore and still make contact with the tapered portion of the bore. With axial movement away from the smaller end 16 and toward the larger end 18, the set of wedges can expand radially and separate from one another in opposition to the restraint of the rubber O-ring 30. The expansion enlarges the central passageway defined by the wedges, and allows the passageway to accept a cable C inserted into the terminal housing 12 from the smaller end 16 as shown in FIGS. 6 and 7.

Figure 5:
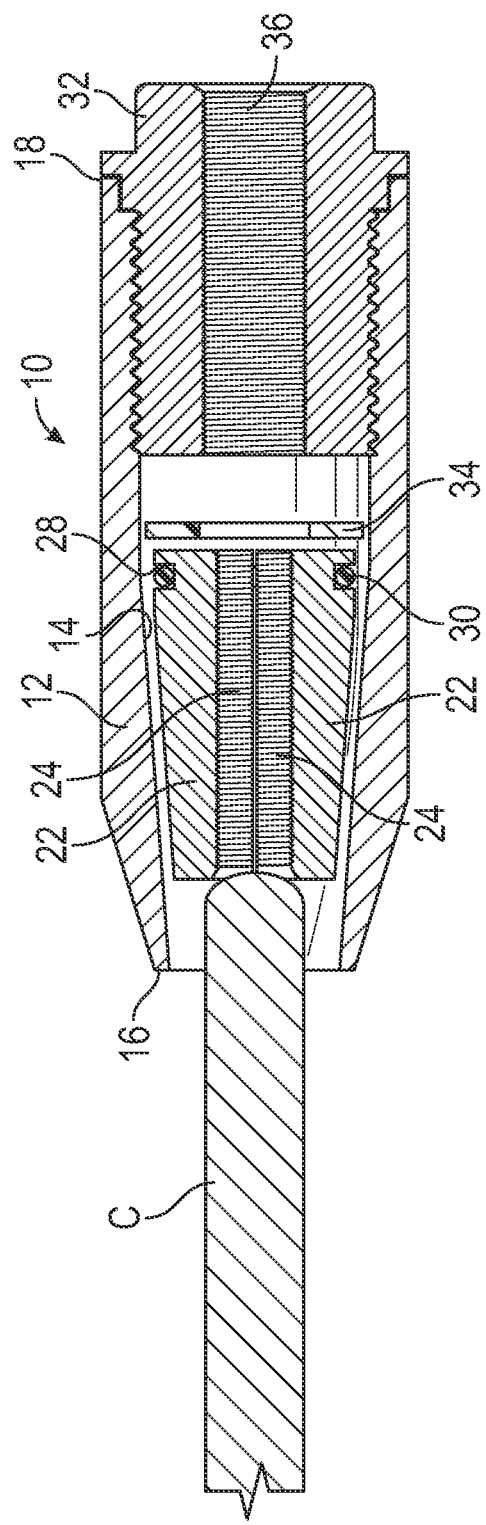
FIG. 5 is a longitudinal cross-section of the swageless terminal of FIG. 1 with a wire cable partially inserted into one end of the housing.

In FIG. 5 a cable C to be secured in the terminal 10 is shown entering the housing 12 at the smaller end 16, and confronting the opening of the central passageway formed by the wedges 22. The entrance of the passageway has a chamfer to facilitate the entry of the cable, and preferably the cable may also be chamfered for the same purpose.

Figure 6:
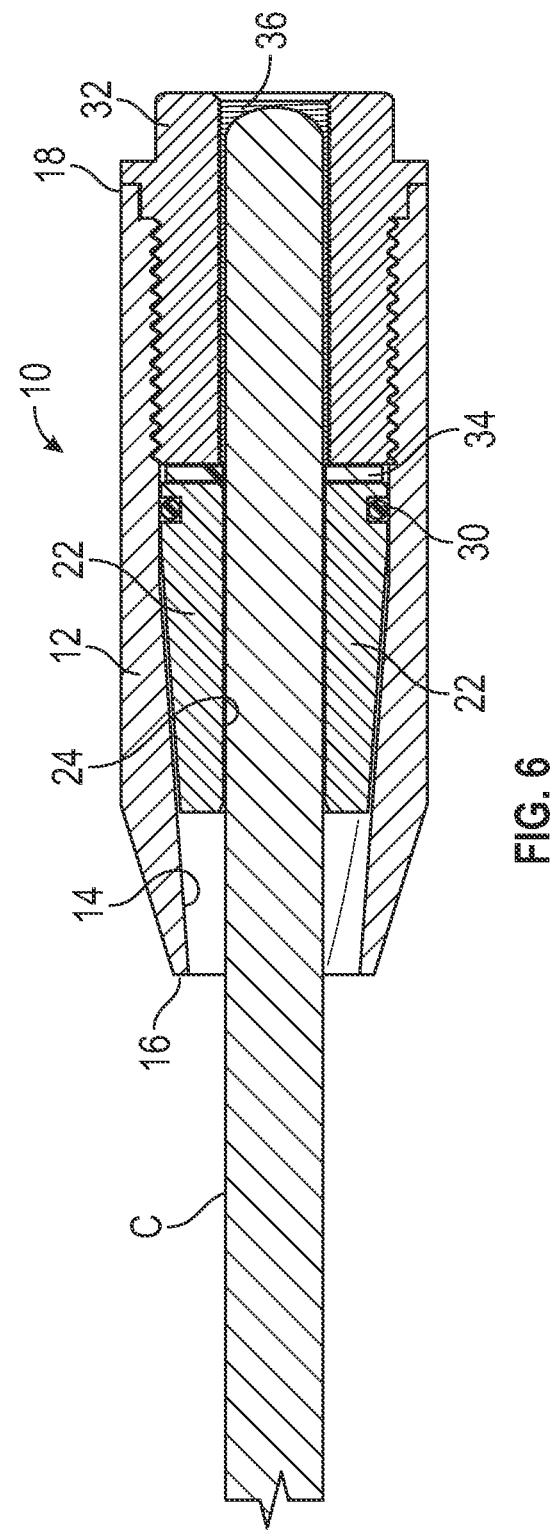
FIG. 6 is a longitudinal cross-section of the swageless terminal with a wire cable inserted into the terminal and through the set of wedges and pressing ring with the wedges and pressing ring against the end cap.
Figure 7:
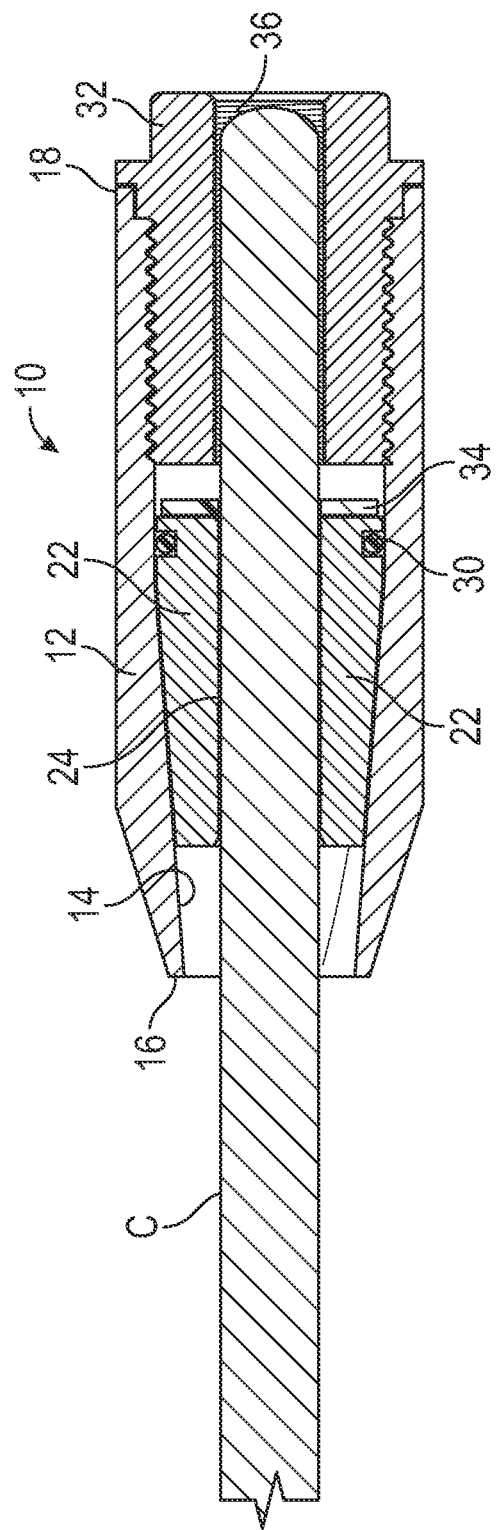
FIG. 7 is a longitudinal cross-section of the swageless terminal with a wire cable inserted into the terminal and under tension causing the set of wedges to be drawn into the tapered bore of the housing and grip the cable.

FIG. 6 shows the cable C pushed further into the terminal 10 from the smaller end 16, which has caused the wedges 22 to expand so that the cable could pass through the central passageway defined by the inner surfaces 24 of the wedges. The cable has also pushed the wedges in the bore 14 of the housing 12 toward an end cap 32, and passed through a resilient pressing ring 34 into a central passageway 36 of the end cap. The end cap is threaded or otherwise secured to the end 18 of the housing 12 and the central passageway 36 may be threaded as well to connect the terminal to a turnbuckle, hook, or other fastener to which the cable is to be connected. Alternatively, the end cap itself may be a fastener. In any event, the passageway 36 in the end cap 32 is larger in diameter than the cable to allow the cable to pass freely into the end cap.

The pressing ring 34 is positioned between the wedges and the end cap 32 at the end 18 of the housing opposite from the smaller end 16, and is made of a resilient material such as rubber or urethane. The ring has an inside diameter selected to have a sliding fit on the cable which allows the cable to slip through the ring upon insertion of the cable in one direction through the smaller end 16 of the housing, but provides enough friction to cause the ring to press the wedges into the bore 14 of the housing 12 when the cable is attempted to be withdrawn in the opposite direction from the smaller end of the housing. For example, for a wire cable, a urethane ring having an inside diameter in the range of 0.005-0.020 inch less than the diameter of the cable is desirable.

FIG. 7 shows the terminal 10 when the cable C is under tension following an attempt to withdraw the cable from the smaller end 16 of the terminal housing 12. The pressing ring 34, due to its frictional engagement with the cable, has moved away from the end cap together with the cable and into contact with the wedges, and urged the set of wedges 22 deeper into a narrower part of the tapered bore 14. The movement of the wedges into the narrower part of the bore 14 aided by the pressing ring 34 and the serrations 26 on the inner surfaces 24 of the wedges which engage the cable, squeezes the wedges against the cable and causes the serrations to securely grip the cable. The wedges are self-actuating, and the operation of the wedges is progressive. The higher the tension on the cable, the greater the gripping forces generated by the wedges.

If it is desired to remove the terminal 10 from the cable C or re-locate the terminal on the cable, the terminal can be released from gripping engagement with the cable by pushing the cable into the narrow end 16 of the terminal housing 12. The wedges 22 will simultaneously move within the tapered bore 14 and release the gripping engagement. The terminal can then be moved to another location or be removed entirely from the cable.

While the swageless cable terminal has been described in a preferred embodiment, it should be understood that numerous variations in the design can be made without departing from the invention. For example, the end cap 32 is shown with threading in the passageway for connection with another fastener for anchoring the terminal or joining the terminal to another object. However, the connection with the terminal can also be made with a fastener or other device such as a washer on the outer side of the terminal housing or a flange on the end cap. It should also be apparent that the end cap is not essential to the utility of the terminal. Although the end cap has been shown as stop which the pressing ring 34 engages when a cable is pushed into the terminal housing 12 and through the wedges 22 and ring, a terminal without an end cap or with the end cap removed will still allow the wedges and a pressing ring to be mounted on a cable that is pushed into and through the bore of the housing. Accordingly, the present invention has been described in several embodiments by way of illustration rather than limitation.

What is claimed is:

1. A swageless cable terminal for gripping a cable comprising:
an elongated terminal housing having a hollow bore extending from one end of the elongated housing to the opposite end, one portion of the bore between the ends being a tapered portion tapering toward the one end with a narrower part of the bore closer to the one end;
a set of tapered wedges fitting in the tapered portion of the hollow bore of the elongated terminal housing, the set of wedges collectively defining a central passageway admitting a cable inserted into the bore of the elongated terminal housing from the one end, and gripping and restraining an admitted cable in the passageway when the set of wedges is urged into the tapered portion of the bore while a cable is drawn toward the one end; and
a pressing ring positioned in the hollow bore between the set of tapered wedges and the opposite end of the elongated terminal housing, and having an inside diameter selected to have a friction fit on a cable inserted into the elongated terminal housing and through the passageway of the set of wedges for urging the set of wedges into the tapered portion of the bore and gripping the cable as the cable is attempted to be withdrawn from the one end.

2. A swageless cable terminal for gripping a cable as defined in claim 1, wherein the wedges have gripping teeth lining the passageway defined by the set of wedges.

3. A swageless cable terminal for gripping a cable as defined in claim 1, wherein the pressing ring is a compliant ring made from a material selected from the group of rubber and urethane materials.

4. A swageless cable terminal for gripping a cable as defined in claim 3, wherein the compliant ring is a rubber O-ring.

5. A swageless cable terminal for gripping a cable as defined in claim 3, wherein the compliant ring is a urethane washer.

6. A swageless cable terminal for gripping a cable as defined in claim 1, wherein the set of wedges comprises two or more wedges distributed circumaxially about the hollow bore of the terminal housing.

7. A swageless cable terminal for gripping a cable as defined in claim 1, wherein the wedges of the set are distributed in the hollow bore of the terminal housing about the bore in a radially expandable relationship by means of an O-ring circumscribing the wedges.

8. A swageless cable terminal for gripping a cable as defined in claim 1, wherein the wedges of the set are retained in the hollow bore of the terminal housing in an axially aligned relationship with one another by an O-ring engaging circumferential grooves in the wedges.

9. A swageless cable terminal for gripping a cable as defined in claim 1, wherein an end cap is connected to the opposite end of the terminal housing.

10. A swageless cable terminal for gripping a cable as defined in claim 9, wherein the end cap has a passageway large enough to allow a cable to pass freely into the end cap.

11. A swageless cable terminal for gripping a cable comprising:
an elongated terminal housing having a hollow internal bore with a tapered portion causing one end of the bore at one end of the elongated terminal housing to be smaller than the opposite end of the bore at the opposite end of the elongated terminal housing;

a set of wedges in the tapered portion of the hollow internal bore of the elongated terminal housing collectively defining a central passageway for a cable inserted into the elongated terminal housing from the one end and through the passageway within the wedges, the wedges being adapted to grip and restrain a cable inserted in the passageway; and a pressing ring positioned in the hollow internal bore between the set of wedges and the opposite end of the elongated terminal housing, the ring having an inside diameter selected to slide onto a cable inserted into the elongated terminal housing and through the passageway of wedges and urge the set of wedges into the tapered portion of the bore and grip the cable when the cable is withdrawn from the one end of the elongated terminal housing.

12. A swageless cable terminal for gripping a cable as defined in claim 10, wherein the pressing ring is made from a compliant material.

13. A swageless cable terminal for gripping a cable as defined in claim 11, wherein the compliant material is selected from the group of rubber and urethane materials.

14. A swageless cable terminal for gripping a cable as defined in claim 10, wherein the pressing ring is a compliant ring with an inside diameter selected to cause the ring to be expanded when mounted on a cable.

15. A swageless cable terminal for gripping a cable as defined in claim 10, wherein the set of wedges comprises two or more wedges distributed circumaxially about the central passageway.

16. A swageless cable terminal for gripping a cable as defined in claim 14, wherein the set of wedges are held in axially aligned relationship in the bore of the elongated terminal housing by an O-ring.

17. A swageless cable terminal for gripping a cable as defined in claim 14, wherein the wedges have gripping teeth lining the central passageway for gripping an inserted cable.

18. A swageless cable terminal for gripping a cable as defined in claim 10 further including an end cap secured to the opposite end of the terminal housing.

19. A swageless cable terminal for gripping a cable as defined in claim 18, wherein the end cap has a central passageway permitting a cable to be inserted therein.

20. A swageless cable terminal for gripping a cable as defined in claim 18, wherein the end cap when secured to the opposite end of the terminal housing and the wedges are in gripping engagement with the cable, the end cap and pressing ring are spaced from one another.

\* \* \* \* \*